United States Patent Office 3,692,568
Patented Sept. 19, 1972

3,692,568
WAX COATED POLYMERIC ARTICLES
Richard C. Clark, Orange, Calif., assignor to Union Oil Company of California, Los Angeles, Calif.
No Drawing. Filed July 13, 1970, Ser. No. 54,586
Int. Cl. B44d 1/22
U.S. Cl. 117—138.8 UA    4 Claims

ABSTRACT OF THE DISCLOSURE

An article comprising a polymer substrate made up principally of an acrylic polymer or copolymer is coated with a highly adhesive wax blend comprising paraffin wax and a minor proportion of a compatibility agent consisting essentially of a copolymer of an olefin monomer and an acrylic monomer.

BACKGROUND OF THE INVENTION

The use of synthetic high polymers to make various molded articles, films, sheets, and the like, is well known. However, some such uses have not been entirely satisfactory, and difficulties have been encountered which, in some cases, present substantial problems in the art. For example, some polymeric articles, especially films used for surfacing materials, are not entirely moisture resistant. Moreover, some polymeric materials are so unattractive, due to insufficient glossiness, as to be unsuitable for decorative uses. Further, some such materials are easily dented and scarred, which greatly lessens their value when used in services which require stronger surfaces. These problems may be especially serious in the case of plastics or other polymers which are used on furniture, e.g., as in plastic coated wood panels, shelves, and the like, where they may be subjected to substantial abrasion or other causes of rapid wear.

One improvement which has met with considerable success has been to apply wax coatings to polymeric surfaces. This adds some measure of protection against wear. Also, paraffin wax or conventional furniture waxes can be applied to plastic coated wood panels and the like to greatly improve the gloss and moisture resistance of the plastic. Also, the wax surface makes it possible to camouflage or even remove dents and abrasions merely by applying a fresh coat of wax. However, there are problems encountered in using conventional waxes on polymeric substrates. Some polymeric substrates show a tendency to spot when contacted with water or other moisture. Also, they may have a tendency to flake, chip, peel or otherwise exhibit poor adhesive characteristics.

Thus, it is considered highly desirable to develop combinations of wax coatings on polymeric articles without encountering these and other prior art problems.

SUMMARY OF THE INVENTION

This invention contemplates articles of manufacture and methods of their preparation involving an organic polymeric substrate coated with wax blends whose compositions have been tailored to provide excellent adhesion between the wax and the substrate. In accordance with the invention a polymeric substrate prepared from monomers containing principally $C_3$ or higher monomers, i.e., containing three or more carbon atoms, is coated with wax blends which contain a principal polymeric compatibility agent which is compatible with both the wax and the substrate. Preferably, the polymeric compatibility agent is an interpolymer having at least two monomeric constituents of which one is highly compatible with the wax and the other is highly compatible with the polymeric substrate. The wax blend is applied to the substrate at a sufficiently high temperature to soften the compatibiliy agent polymer or interpolymer and promote adhesion between the wax blend and the substrate.

Preferably, the polymer or interpolymer used as a compatibility agent in the wax is prepared from monomers at least one of which is substantially the same as the monomer from which the substrate is formed. Thus, for acrylic classes of substrates one preferably uses acrylic classes of compatibility agent polymers in the wax; for vinyl classes of substrates, vinyl type polymeric compatibility agents are preferably used. Similarly, for polyolefin substrates, polyolefinic compatibility agents are used.

It is especially preferable to use the same species of monomer in the compatibility agents as that of the substrate. Thus, for example, when a principal constituent of the substrate is polymethylmethacrylate, it is most preferable to use a compatibility agent in the wax having a polymethylmethacrylate constituent, rather than some other acrylate.

In some cases, a single monomer may not form a polymer which is sufficiently highly compatible with both the wax and the substrate. In these cases it is a particular feature of this invention to use interpolymers prepared from at least two monomers of which one monomer is of a type which forms polymers that are compatible with the wax and the other monomer is of a type which forms polymers that are compatible with the substrate. For example, for substrates containing principally polymers of styrene, it may be desirable to use an olefin-styrene copolymer, such as propylene-styrene copolymer as the compatibility agent in the wax, the styrene being compatible with the substrate and the propylene being compatible with the wax.

It is also contemplated to use a second polymer in the wax which is still more compatible with the wax than the principal compatibility agent and which is also highly compatible with said principal compatibility agent. This may improve the compatibility of the principal agent with the wax. For example, when wax is applied to an acrylic acid-vinyl chloride polymeric substrate, and an interpolymer of ethylene and acrylic acid is used in the wax to promote adhesion, a second polymer of low molecular weight polyethylene, which is especially compatible with the wax, may be highly beneficial to the composition as a whole.

DESCRIPTION OF THE PREFERRED EMBODIMENTS

It is contemplated to use this invention with any conventional coating waxes, including mineral waxes such as paraffin wax and microcrystalline waxes from petroleum, and montan wax, lignite wax, ozocerite, ceresin, and the like. Vegetable waxes such as sugar cane, cocoa butter, carnauba waxes, and the like, may also be used. Also, animal waxes including bees wax, wool wax, and the like, may be used. It is especially preferred to use the waxes which contain principally paraffinic waxes obtained from the distillation and dewaxing of petroleum. Such waxes have a molecular structure markedly similar to that of polyolefins, and accordingly, numerous polyolefinic compatibility agents may be rendered applicable for use with such waxes in accordance with this invention.

In order to produce hard, durable wax finishes on a polymeric substrate, it is preferable to use relatively high molecular weight waxes having melting points of at least about 140° F., and preferably about 150° F. to 180° F. To achieve very high melting points while using paraffin waxes, it may be desirable in some cases to add up to about 2 parts by weight of microcrystalline wax per part of paraffin wax.

In the preferred embodiments of this invention it is contemplated to use at least about 50% by weight of wax in the wax blends that are coated on the substrates. The principal compatibility agents are present in amounts ranging from about 0.005 to about 1.0, and preferably about 0.01 to about 0.10, part by weight per part of wax. More of the polymeric compatibility agent can be used; However, this is generally expensive, and furthermore, the wax blend tends to take on more of the characteristics of the polymer than those of the wax when an excess of polymer is used.

The second polymer, if any, can be present in any amount which is compatible with the wax. Usually less than about 1 part, and preferably from about 0.01 to about 0.10 part, of the second polymer per part of wax is used.

When an interpolymer is used as the principal compatibility agent in accordance with this invention, it is contemplated to use generally those containing about 5 to about 50 mole percent of the monomer of the substrate type and about 50 to 95 percent of monomer which is compatible with the wax. Preferably however, about 70 to 95 percent of the interpolymer constituent is monomer of the wax-compatible type. This is desirable since wax compatibility is, in general, more critical than close compatibility with the substrate.

The principal compatibility agent can be a polymer of a single monomer of the olefinic type such as ethylene, propylene, isobutylene, and the like. Alternatively, copolymers of ethylene and vinyl halides and esters such as, e.g., vinyl chloride, vinyl acetate, and the like, may also be used. The alpha-beta unsaturated carboxylic acids and esters such as the acrylics can also be used, as can aromatic monomers such as styrenes, substituted styrenes and phenols.

Other interpolymers contemplated for use in this invention include terpolymers of vinyl halides and esters such as polyethylenevinyl acetate-vinyl chloride, terpolymers of ethylene, vinyl chloride and acrylates, polymers of olefins, conjugated diolefins and alpha-beta unsaturated nitriles such as ethylene, butadiene and acrylonitrile. It is also contemplated to use polymers of styrenes and conjugated diolefins such as butadiene and styrene. Also, polymers of dibasic acid anhydrides, such as maleic anhydride, with alkenes or styrenes such as isobutylene, propylene, styrene, methylstyrenes, and the like are contemplated for use. Other polymers which may be useful include those of vinyl halides and nitriles, such as polyvinylidene chloride-acrylonitrile and olefinconjugated diolefin copolymers such as propylene-butadiene copolymers. Also polymers of substituted acrylates and dibasic acids such as diallyl maleate-methylmethacrylate copolymers may be used with sufficient polyolefin content for wax compatibility. It is also contemplated that graft polymers, mixtures of polymers and copolymers as well as terpolymers and higher interpolymers of the monomers mentioned above may be used in accordance with this invention. For example, terpolymers of vinylacetate, methylacrylate and methylacrylic, itaconic, crotonic, or maleic acids may be used. Similarly vinyl halides, vinyl esters of lower fatty acids, e.g., vinylacetate, and alpha-beta olefinic carboxylic acids may be polymerized into terpolymers or prepared with blends which are suitable for this invention.

It is contemplated that for the second polymer, if any, is used, any of the particularly compatible polymers of the same classes listed for the principal polymers or interpolymers may be used. Preferably, however, the conventional wax additive polymers such as those of ethylene, propylene, vinylacetate, ethylene vinylacetate and ethylene ethylacrylate are used since these polymers are capable of a high degree of compatibility with waxes in general and especially with petroleum paraffin waxes. Especially preferred is polyethylene having an average molecular weight between about 1,000 and 40,000.

The conventional wax additives such as inhibitors, slip agents, and the like may also be used in the compositions of this invention.

The following examples are illustrations of the use of this invention to prepare unique articles of manufacture having a polymeric substrate which is coated with the highly compatible wax blends to obtain articles having improved gloss, hardness, toughness, resistance to water spotting, and other important adhesive characteristics.

In Examples 1 to 3 a plywood panel was roll-coated with three layers of acrylic acid-vinylchloride copolymer. A finishing layer of wax was then roll-coated on the surface of the acrylic-acid vinylchloride resin using conventional roll coating apparatus at temperatures above the melting point of the wax. The wax blend compositions are shown in the following table:

WAX BLEND COMPOSITION

| Example | Wax,[1] wt.-percent | Compatibility agent[2] Type | Wt.-percent | Other additives[3] Type | Wt.-percent |
|---|---|---|---|---|---|
| 1 | 84 | Ethylene-acrylic acid copolymer. | 6 | Polyethylene | 10 |
| 2 | 77 | ___do___ | 2.5 | Polyethylene | 10 |
|   |    |           |     | Gilsonite | 0.5 |
| 3 | 77 | ___do___ | 3 | Polyethylene | 10 |

[1] A paraffinic petroleum wax having a melting point (AMP) of about 164° F. and a Brinell hardness at 60° F. of about 55, sold commercially by Union Oil Company of California under the trademark "Aristowax 165."

[2] The compatibility agent consisted of a copolymer of ethylene and acrylic acid having a ratio of about 9 parts by weight of ethylene per part of acrylic acid, sold commercially under the trademark "Zetafax 1680."

[3] The polyethylene was a low molecular weight polyethylene having a ring and ball melting point of 248° F. and a viscosity at 300° F. of 42 to 80 centipoises, sold commercially under the trade name "Cardipol N-50." The Gilsonite is a conventional natural fossil resin pigmenting agent.

To illustrate the effects obtained by preparing wax blends containing both a principal compatibility agent and a secondary polymeric agent, Examples 4, 5, and 6 were run using the compositions shown in the following table to coat panels using a hot putty knife.

WAX BLEND COMPOSITION

| Example | Percent Wax[4] | Compatibility agent[5] | Other additives[6] | Brinell hardness[7] |
|---|---|---|---|---|
|   | 90 | 0 | 10 | 88 |
|   | 95 | 5 | 0 | 88 |
|   | 87 | 3 | 10 | 139 |

[4] The wax was a petroleum paraffin having an AMP melting point of about 147° F. and a Brinell hardness at 60° F. of about 65, sold by Union Oil Company of California under the trademark "Aristowax 143/150."

[5] The compatibility agent used in Examples 4, 5 and 6 was the same as that of Examples 1 through 3.

[6] The same polyethylene additive used in Examples 1, 2 and 3 was used in Examples 4 to 6.

[7] The Brinell hardness was obtained according to the equation:

Hardness = $200 \, P/[\pi \, D(D-\sqrt{D^2-d^2})]$
where P = load (kg.). D = Ball diameter, mm. = 9.520 mm.
d = Diameter of surface indention, mm.

The unique effect of using both the copolymeric compatibility agent and the low molecular weight polyethylene secondary agent is clearly illustrated by the synergistic effect on the hardness of the wax coating. Thus, while the compatibility agent alone produces excellent adhesion characteristics, preventing water spotting, etc., the combination of the ethylene-acrylic acid compatibility agent and the polyethylene additive, as used in Example 6, resulted in an increase in the Brinell hardness of almost 60%.

In addition to the method of roll-coating or manually applying the wax on the polymeric substrate, it is contemplated that other coating procedures can be used. For example, curtain coating, immersion coating, or other surface coating techniques would be applicable. Also it is contemplated to use the coatings on solid articles such as blow molded or injection molded objects including, for example, furniture, shelving, and decorator items. In the preferred embodiments of the invention, however, the highly adhesive wax coatings of this invention are especially advantageously used on films or sheets of polymeric substrates such as those described for use as coatings on wood panels.

Whatever use is made of the unique coating compositions of this invention, it is believed that superior adhesive characteristics can be obtained. Such characteristics are extremely desirable in preventing water spotting and other defects in the coatings which may occur on poorly adhering coatings.

In general, it is considered desirable to use compatibility agents having molecular weights below about 100,000 and preferably ranging about 5,000 to 50,000 and having softening points ranging about 180° F. to 300° F. to insure that the flow and smooth contact of the wax coating with the substrate is achieved.

I claim:

1. An article having a surface area composed of an acrylic polymer or copolymer coated with a wax blend comprising at least about 50 weight-percent paraffin wax, a minor proportion of a low molecular weight polyethylene, and about 1–10 weight-percent of a compatibility agent consisting essentially of a copolymer of an olefin monomer and an acrylic monomer.

2. An article as defined in claim 1 wherein the copolypolymer of said compatibility agent comprises about 70–95 mole-percent of said olefin monomer.

3. An article as defined in claim 1 wherein said substrate comprises an acrylic acid-vinyl chloride copolymer.

4. An article as defined in claim 3 wherein said compatibility agent comprises a copolymer of ethylene and acrylic acid.

References Cited

UNITED STATES PATENTS

| | | | |
|---|---|---|---|
| 3,412,059 | 11/1968 | Stickelmeyer | 117—138.8 X |
| 3,235,431 | 6/1967 | McManus | 117—138.8 X |
| 3,403,048 | 9/1968 | Grimm et al. | 117—138.8 X |
| 3,140,198 | 7/1964 | Dawson et al. | 117—138.8 |
| 3,201,362 | 8/1965 | Mark | 117—168 X |
| 3,450,559 | 6/1969 | Schaufelberger | 117—138.8 X |
| 3,369,932 | 2/1968 | Sawyer et al. | 117—168 X |
| 3,117,101 | 1/1964 | Moyer | 117—168 X |

WILLIAM D. MARTIN, Primary Examiner

M. R. LUSIGNAN, Assistant Examiner

U.S. Cl. X.R.

17—72, 168